July 13, 1954   J. G. MARTIN   2,683,504
BRAKE ASSEMBLY

Filed March 1, 1950   3 Sheets-Sheet 3

INVENTOR.
JOHN G. MARTIN
BY
G A Gust
ATTORNEY

Patented July 13, 1954

2,683,504

UNITED STATES PATENT OFFICE 2,683,504

BRAKE ASSEMBLY

John G. Martin, South Bend, Ind., assignor to Bendix Aviation Corporation, South Bend, Ind., a corporation of Delaware Application March 1, 1950, Serial No. 147,100

13 Claims. (Cl. 188—72)

The present invention relates to brakes and more specifically to disc brakes and the particular component parts thereof. This invention may be utilized with an aircraft or railroad wheel.

The heats developed in aircraft and railroad brakes are, as a general rule, of such character as to cause damage to the component parts. In aircraft brakes, certain disc parts reach a red heat in a matter of a few seconds, this phenomenon being due to the relatively light weight of the parts. In railroad brakes where heavier and larger disc parts may be used, such red heats are usually limited to the surface areas. It has been found in practice that as solid annular disc parts cool and contract, fractures will appear as a result of thermal stresses and the loads imparted by the associated members which will not allow free and even contraction.

It is a primary object of the present invention to provide a disc brake having its component parts so formed and arranged that excessive heat or ambient temperature will not have an injurious effect on the brake and its parts. This object is accomplished by using a segmented brake disc which may be either rotatable or nonrotatable, depending upon the specific brake design, and in which the segments encounter substantially no resistance in contracting after a heat-growth. In the disclosed embodiment of this invention, the various segments are held in place by means of partially encompassing supports which are characterized by the absence of tension connections to fit between segments which might cause contracting fractures.

Other objects of this invention are to reduce the tendency of the discs to warp from asymmetric thermal stresses and to provide a segmented disc, having all the favorable attributes of segmentation, which can be handled, with facility, during manufacturing and servicing as a single assembly. Still further objects will become apparent as the description proceeds.

The disclosure of this application is in part the same as Albright applications Serial Nos. 130,426 and 144,943, filed on December 1, 1949, and February 18, 1950, respectively, and the claims hereof cover matter not claimed in said applications.

Figure 1:
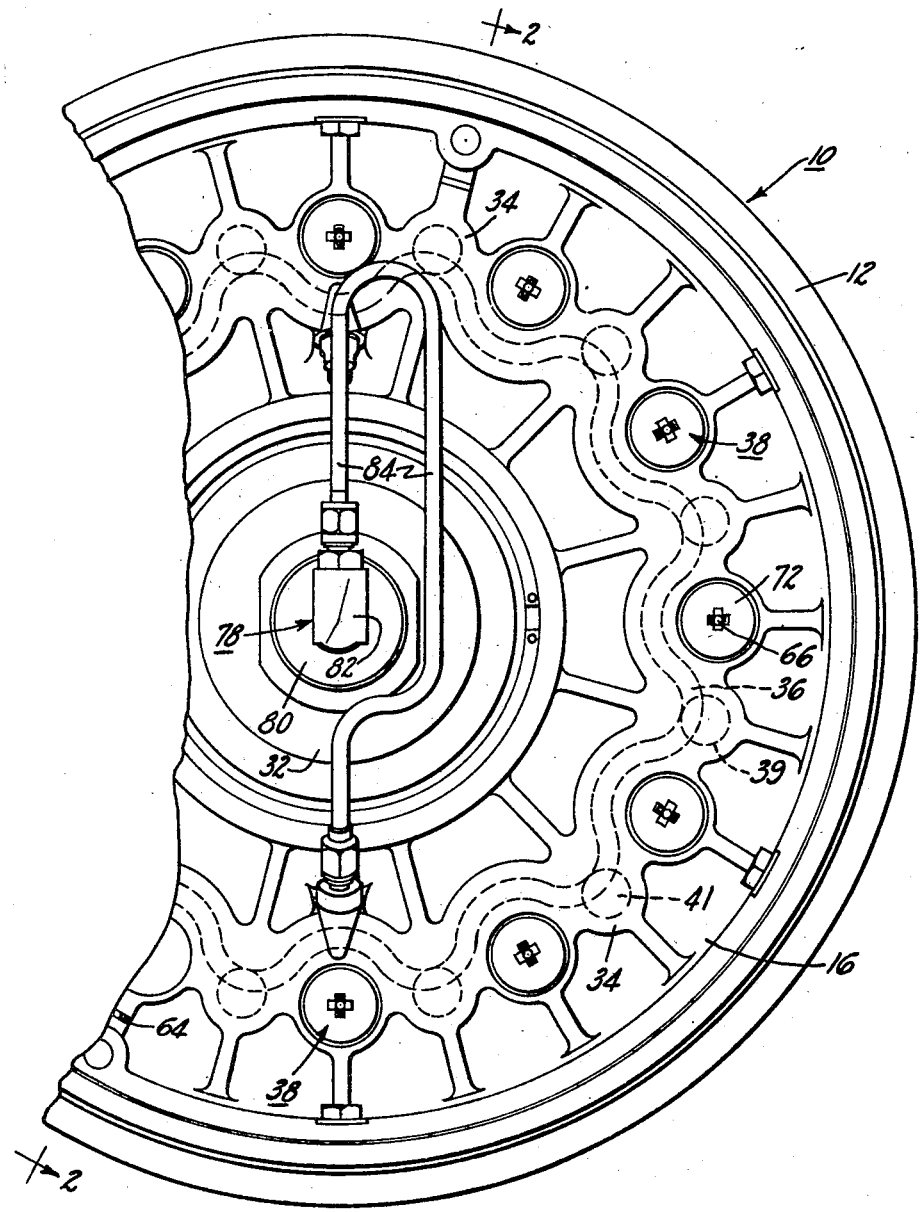
Figure 1 is a partial side elevation of an assembly utilizing the present invention.
Figure 2:
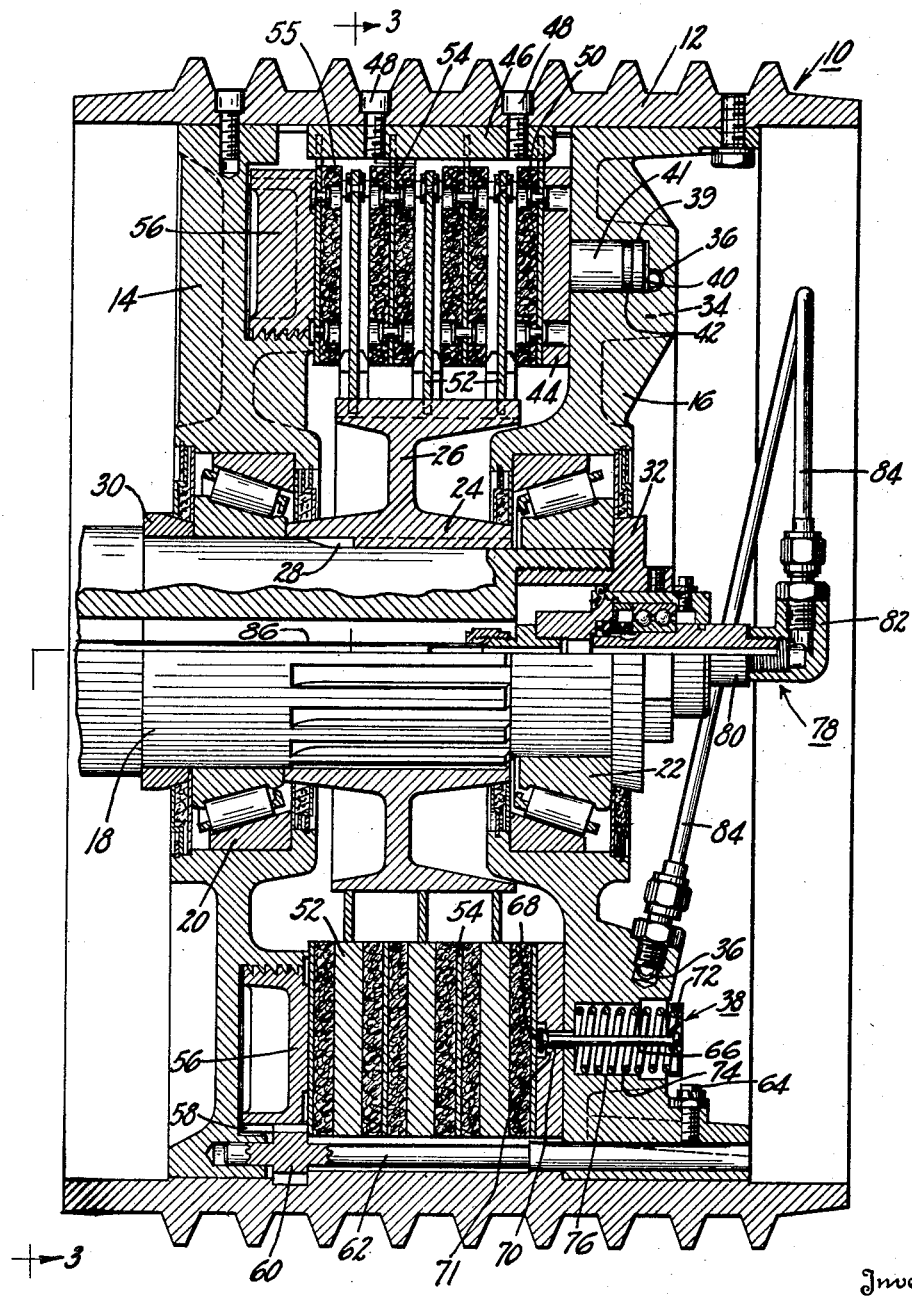
Figure 2 is an axial section taken substantially on section line 2—2 of Figure 1.
Figure 3:
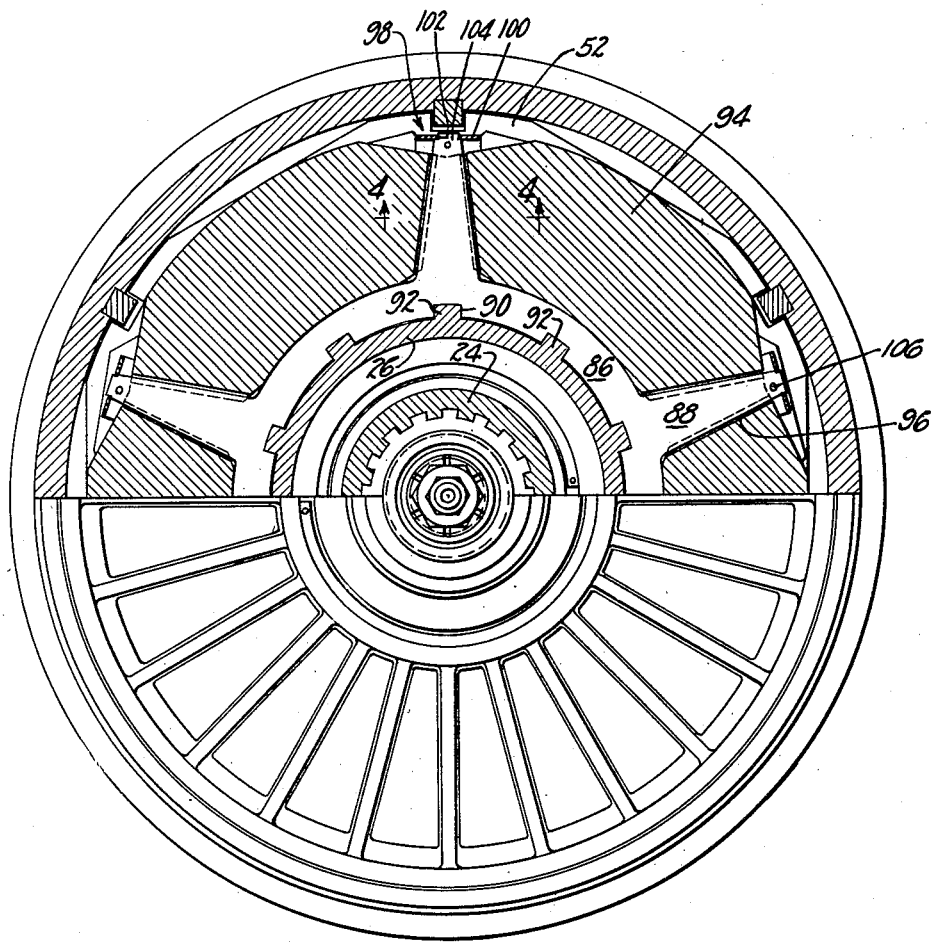
Figure 3 is a side elevation of the other side of Figure 1 showing an embodiment of the present invention in part section taken substantially on section line 3—3 of Figure 2.
Figure 4:
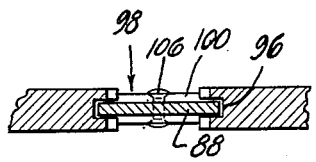
Figure 4 is an enlarged fragmental section taken substantially on section line 4—4 of Figure 3.

Referring to the drawings, a wheel 10, shown to be of the track gear type, is comprised of a rim 12, and a pair of side plates or support members 14 and 16 journaled on a hollow axle 18 by means of the spaced bearings 20 and 22, respectively. The hub 24 of torque-taking member 26 is provided with lands and grooves which fit the splines 28 on axle 18. Spacer ring 30, suitably held in place on axle 18, prevents outward movement of bearing 20 while the annular hub nut 32 holds bearing 22 in place.

The side plate 14 may be of conventional design and provided with openings for ventilation and to lighten the weight. Side plate 16 is provided with a plurality of circumferentially spaced bosses 34 which serve as hydraulic actuator housings. A stainless steel tube 36, or a tube formed of similarly suitable material, is cast within the side plate 16 to pass near the outside end of each boss 34. In the illustrated version, the tubular member 36 is scalloped or undulated to register with the ends of the bosses 34 and to avoid the return spring assemblies 38. The bosses 34 are provided with axially extending cylinder bores 39 which communicate with the interior of conduit 36 by means of openings 40.

Pistons 41 provided with sealing rings 42 are reciprocably received in bores 39 to axially shift the brake pressure plate 44 which is carried for rotation with the wheel 10 by a plurality of circumferentially spaced, axially extending driving keys 46. These keys 46 are suitably secured to the inner periphery of rim 12 by bolts 48 or the like. Secured to the face of pressure plate 44 is friction lining 50 which is adapted to frictionally engage one of the nonrotatable brake elements or stators 52. These elements 52 are keyed for axial movement only on torque member 26, and the particular construction of a single element 52 will be described in detail hereinafter. Axially movable, rotatable brake elements or rotors 54 carrying friction lining and mounted on keys 46 are interleaved with the stator elements 52. A friction lining 55 is suitably supported on a rotatable annular element to operatively abut the inner face of side plate 14, and takes the compressive load of the brake as it is applied. Side plate 14 thereby functions as the conventional backing plate.

To compensate for lining wear, an adjusting mechanism is provided in the form of ring nut 56 threadedly received by a coaxial extension on support member 14 and provided on its outer periphery with gear teeth 58. A pinion 60 engages gear teeth 58 and is secured to a shaft 62 which protrudes from one side of the wheel. By rotating this shaft, nut 56 is shifted axially to compensate for lining wear. A set screw 64 is provided to hold shaft 62 against accidental rotation.

Return spring assemblies 38 release the brakes and each assembly comprises a tension pin 66 having a head 68, said pin 66 passing through opening 70 in plate 44 with head 68 being accommodated in recess 71. A spring retaining cup 72 is secured to the other end of pin 66 and serves to position compression spring 74 in cavity 76 formed in carrier 16. Thus it is seen that spring 74 acts through pin 66 to urge pressure plate 44 against carrier 16. As many assemblies 38 may be used as desired.

Since the actuators 41 rotate with the wheel, a hydraulic swivel fitting 78 is necessary to transfer pressure fluid from a stationary conduit to one that rotates.

Fitted to the outlet end of swing nipple 80 of swivel fitting 78 is a suitable right angle connection 82 which receives an end of external conduit 84. The other end of conduit 84 is connected to an opening in conduit 36, thereby completing the hydraulic system of the braking mechanism.

Each brake stator 52 is comprised of a sheet metal spider formed by an annular retainer 86 and a plurality of integral circumferentially spaced radially extending spacers or torque projections 88. The inner periphery of retainer 86 is formed with a plurality of circumferentially spaced notches 90 which slidably engage respective axially extending keys 92 preferably formed as integral parts of torque-absorbing member 26. Thus it is seen that retainer 86 may be shifted axially while being held against rotation by virtue of its keyed connection with member 26.

A plurality of arcuate brake disc segments 94, usually formed of metal, are fitted between facing edges of spacers 88 to rest on respective circumferential portions of retainer 86. Each end edge of segments 94 may be provided with a radially extending groove 96, the sides of which straddle the marginal radial edge of a respective spacer 88 to hold the segment against lateral displacement.

To complete the structure which positively engages and secures each segment in place, fastening or cotter members indicated generally by reference numerals 98 are used. Cotter members of different design from that disclosed herein may be used without departing from the spirit of this invention, the one important design feature being that each segment 94 be held in its assembled position. The illustrated cotter member comprises an elongated bar 100 of U-shaped cross-section formed by folding a sheet metal blank to shape. A longitudinal slot 102 is punched in the mid-length of the bottom of bar 100 to receive the end 104 of spacer 88, the sides of bar 100 straddling the end portion of spacer 88. A rivet 106 secures the bar 100 to spacer 88. Little or no radial clearance is needed between each segment 94 and the respective bar 100; however, it has been found in practice that a slight circumferential clearance between the bottom of each slot 96 and the respective spacer 88 is desirable. This clearance is provided to allow for thermal growth of each segment as its temperature rises during a brake application.

It is obvious that after a severe application of the brakes which causes the segments 94 to be heated to a high temperature, there is nothing to resist the contraction of the segments 94 as they cool and to impart thereto uneven loading which would tend to cause fractures.

The following description will explain how the present invention may be adapted for use with railroad rolling equipment.

Axle 18 which is fixed or nonrotatable when used on aircraft is usually rotatable on railroad cars with the railroad wheel being fixedly secured to the end of this axle in a manner well known to the art. To adapt the present invention for use with this wheel, it is only necessary to secure against rotation, in some suitable manner, the structure hereinbefore described as wheel 10 to a stationary part of the railroad car. The torque-absorbing or drive member 26 thus becomes rotatable with the wheel and axle and carries the brake elements 52 around therewith. The brake elements 54 which were formerly rotatable now are stationary except for the requisite axial shifting thereof. In some of the claims, the structure of the wheel 10 is defined as a drum, this term being chosen to cover this structure whether it be rotatable or nonrotatable.

Changes in the construction of the various parts used in the aircraft assembly to efficiently adapt them for use on railroad equipment are obviously necessary and are considered as being well within the skill of the artisan to accomplish and are, therefore, not mentioned here.

It should be expressly stated at this point that this invention is not to be limited by the specific position of the friction lining; i. e. the friction lining may be attached to either the rotatable or nonrotatable brake elements as design preference may dictate.

A brief explanation of the operation of the illustrated embodiment follows. With wheel 10 rotating and the brakes released, pressure fluid is introduced into stationary conduit 86, which passes through swivel fitting 78, external conduit 84, conduit 36, and into the cylinders 39 to force pistons 41 outwardly against pressure plate 44. The brake elements 52 and 54 are thereby compressed against lining 55 and side plate 14 to generate braking torque.

In releasing the brakes, the pressure in conduit 36 is relieved sufficiently to allow return spring assemblies 38 to shift pressure plate 44 to the right and released position.

Although only two embodiments of the invention have been disclosed, various changes in the form and relative arrangements of the parts may be made to suit requirements.

I claim:

1. A wheel and brake assembly comprising a wheel having a rim and side plates, antifriction bearings for said side plates adapted to rotatably support said wheel on an axle, a splined annular nonrotatable torque-absorbing member disposed inside said wheel and provided with circumferentially spaced axially extending integral keys on its outer periphery, a plurality of circumferentially spaced axially extending driving keys carried by said wheel, a plurality of axially movable brake rotors supported on said driving keys for rotation with said wheel, a plurality of brake stators supported on said torque-absorbing member by means of said splines for axial but not rotative movement, said stators and rotors being interleaved for frictional engagement with each other, each brake stator comprising an annular retainer adapted to cooperatively engage said integral keys, a plurality of circumferentially spaced radially diverging torque projections on said retainer, a plurality of circumferentially arranged stator segments mounted on said retainer between said projections, space being provided between the projections and the respective segments to allow for thermal expansion of each segment, a cotter member fastened to the outer end of each of said projections for holding said segments radially inwardly against said retainer, and means for effecting frictional engagement of said rotors and stators.

2. A wheel and brake assembly comprising a wheel having a rim and side plates, antifriction bearings for said side plates adapted to rotatably support said wheel on an axle, a splined annular nonrotatable torque-absorbing member disposed inside said wheel and provided with circumferentially spaced axially extending integral keys on its outer periphery, a plurality of circumferentially spaced axially extending driving keys carried by said wheel, a plurality of axially movable brake rotors supported on said driving keys for rotation with said wheel, a plurality of brake stators supported on said torque-absorbing member by means of said splines for axial but not rotative movement, said stators and rotors being interleaved for frictional engagement with each other, each brake stator comprising a flat annular retainer provided with a notched inner periphery adapted to cooperatively engage said integral keys, a plurality of circumferentially spaced radially diverging torque projections on said retainer, a plurality of circumferentially arranged stator segments mounted on said retainer between said projections, each end edge of said segments being provided with a radial slot, each slot receiving one radial edge of a respective projection thereby retaining said segments in lateral position, said slots being of such depth as to permit thermal expansion of each segment, a plurality of cotter members fastened to the respective ends of said projections holding said segments against radial displacement, and means for effecting frictional engagement of said rotors and stators.

3. A wheel and brake assembly comprising a wheel, a nonrotatable torque-absorbing member cooperatively associated with said wheel, said torque-absorbing member being provided with keys, a plurality of axially movable brake elements carried by said wheel, a plurality of brake elements interleaved with said first mentioned brake elements supported on said keys for axial but not rotative movement, each nonrotatable brake element comprising an annular retainer adapted to cooperatively engage said keys, a plurality of circumferentially spaced radially diverging projections on said retainer, a plurality of circumferentially arranged stator segments peripherally mounted on said retainer between said projections, sufficient space being provided between the projections and the respective segments to allow for thermal expansion of each segment, a cotter member fastened to the outer end of each of said projections holding said segments radially inwardly against said retainer, and means for effecting frictional engagement of said rotatable and nonrotatable brake elements.

4. A wheel and brake assembly comprising a wheel, a nonrotatable torque-absorbing member cooperatively associated with said wheel, a plurality of axially movable brake elements carried by said wheel, a plurality of brake elements interleaved with said first mentioned brake elements supported on said torque-absorbing member, each nonrotatable brake element comprising an annular retainer adapted to be mounted on said torque-absorbing member for axial but not rotative movement, a plurality of circumferentially spaced radially diverging projections on said retainer, a plurality of circumferentially arranged brake segments peripherally mounted on said retainer between said projections, sufficient space being provided between the projections and the respective segments to allow for thermal expansion of each segment, a cotter member fastened to the outer end of each of said projections holding said segments radially inwardly against said retainer, and means for effecting frictional engagement of said rotatable and nonrotatable brake elements.

5. A wheel and brake assembly comprising a wheel, a nonrotatable torque-absorbing member cooperatively associated with said wheel, one or more axially movable brake elements carried by said wheel, one or more brake elements interleaved with said first mentioned brake elements supported on said torque-absorbing member, each nonrotatable brake element comprising an annular support adapted to be mounted on said torque-absorbing member for axial but not rotative movement, a plurality of circumferentially arranged brake segments having two braking surfaces on opposite sides thereof and peripherally mounted on said annular support and held against lateral displacement, a plurality of cotter members fastened to said annular support for holding said segments in radial position, and means for effecting frictional engagement of said rotatable and nonrotatable brake elements.

6. A disc brake assembly comprising a nonrotatable brake drum having spaced side plates, an annular rotatable drive member disposed between said side plates and being provided with a plurality of circumferentially spaced axially extending driving keys, a plurality of disc brake elements carried by said drum for axial but not rotative movement, a plurality of other disc brake elements interleaved with said first mentioned brake elements and supported by said driving keys for axial and rotative movement, each rotatable brake element comprising a flat annular retainer provided with a notched inner periphery adapted to cooperatively engage said keys, a plurality of circumferentially spaced radially diverging projections on said retainer, a plurality of circumferentially arranged segments mounted on said retainer between said projections, and providing thereby two opposite friction surfaces, each end edge of said segments being provided with a radial slot, each slot receiving one edge of a respective projection thereby retaining said segments in lateral position, said slots being of such depth as to permit thermal expansion of each segment, a plurality of cotter members fastened to the respective ends of said projections holding said segments against radial displacement, and means for effecting frictional engagement of said rotatable and nonrotatable brake elements.

7. A disc brake assembly comprising a nonrotatable brake drum having one or more brake elements supported thereby for axial but not rotative movement, a rotatable drive member cooperatively associated with said drum and being provided with a plurality of circumferentially spaced driving keys, one or more other brake elements interleaved with said first mentioned brake elements and supported by said driving keys for axial and rotative movement, each rotatable brake element comprising a flat annular retainer engaging said driving keys, a plurality of circumferentially spaced radially diverging projections on said retainer, a plurality of circumferentially arranged segments having two braking surfaces on opposite sides thereof and mounted on said retainer between said projections, a plurality of cotter members fastened to the respective outer ends of said projections holding said segments radially inwardly against said retainer, and means for effecting frictional engagement of said brake elements.

8. A disc brake assembly comprising a nonrotatable brake drum having one or more brake elements supported thereby for axial but not rotative movement, a rotatable drive member cooperatively associated with said drum, one or more other brake elements interleaved with said first mentioned brake elements and supported on said drive member for axial and rotative movement, each rotatable brake element comprising a retainer supported on said drive member, a plurality of circumferentially spaced radially diverging projections on said retainer, a plurality of circumferentially arranged segments marginally supported on said retainer between said projections, each segment having two oppositely facing braking surfaces and being of such circumferential extent as to allow for substantially uninhibited thermal circumferential expansion, a plurality of cotter members fastened to the respective outer ends of said projections holding said segments radially inwardly against said retainer, and means for effecting frictional engagement of said brake elements.

9. A disc brake assembly comprising a nonrotatable brake drum having a plurality of brake elements supported thereby for axial but not rotative movement, a rotatable drive member cooperatively associated with said drum, a plurality of other brake elements interleaved with said first mentioned brake elements and supported on said drive member for axial and rotative movement, each rotatable brake element comprising a plurality of circumferentially arranged disc sections, a plurality of spacer members peripherally supporting said disc sections, each disposed between respective adjacent ends of said disc sections and formed to provide for substantially uninhibited thermal circumferential expansion of said disc sections, radial locating members associated with said spacer members for retaining said disc sections in radial position, and means for effecting frictional engagement of said brake elements.

10. In a wheel and brake assembly having a plurality of axially extending key members, a friction disc comprising a flat annular retainer provided with a portion adapted to operatively engage said key members, a plurality of circumferentially spaced radially diverging projections on said retainer, a plurality of circumferentially arranged brake segments mounted on said retainer between said projections, each end edge of said segments being provided with a radial slot, each slot receiving one edge of a respective projection thereby retaining said segments in lateral position, said slots being of such depth as to permit thermal expansion of the respective segments, and a plurality of cotter members fastened to the ends of respective projections holding said segments against radial displacement.

11. In a wheel and brake assembly having a plurality of axially extending key members, a friction disc comprising a retainer adapted to operatively engage said key members, a plurality of circumferentially spaced radially diverging digitate projections on said retainer, a plurality of circumferentially arranged brake segments mounted on said retainer between said digitate projections, spaces being provided between said digitate projections and said segments to provide for thermal circumferential expansion of said segments, and a plurality of cotter members fastened to the outer ends of respective projections holding said segments radially inwardly against said retainer.

12. A friction member for disc brakes comprising an annular retainer having circumferentially spaced radially diverging flat projections, a plurality of disc segments having their end edges formed with radial slots and having two oppositely facing friction surfaces, said segments being disposed between respective projections with the slots receiving respective edges of said projections, and a plurality of cotter members fastened to the outer ends of respective projections holding said segments in radial position against said retainer.

13. A friction member for disc brakes comprising an annular retainer having circumferentially spaced radially diverging flat projections, a plurality of disc segments having their end edges provided with radial slots and having two oppositely facing friction surfaces, said segments being disposed between said projections with the slots receiving respective edges of said projections, and means fastened to said projections for holding said segments in radial position.

References Cited in the file of this patent

UNITED STATES PATENTS

| Number | Name | Date |
|---|---|---|
| 506,767 | Campany | Oct. 17, 1893 |
| 1,913,802 | Gregory | June 13, 1933 |
| 2,381,166 | Hollerith | Aug. 7, 1945 |
| 2,423,881 | Du Bois | July 15, 1947 |

FOREIGN PATENTS

| Number | Country | Date |
|---|---|---|
| 171,503 | Great Britain | Nov. 24, 1921 |